(12) United States Patent
Farmiga

(10) Patent No.: US 9,513,453 B2
(45) Date of Patent: Dec. 6, 2016

(54) BALL CAGE ASSEMBLIES FOR CENTRATION OF AXIALLY THICK LENSES AND RELATED METHODS AND SYSTEMS

(71) Applicant: Bioptigen, Inc., Morrisville, NC (US)

(72) Inventor: Nestor O. Farmiga, Rochester, NY (US)

(73) Assignee: Bioptigen, Inc., Morrisville, NC (US)

( * ) Notice: Subject to any disclaimer, the term of this patent is extended or adjusted under 35 U.S.C. 154(b) by 100 days.

(21) Appl. No.: 14/573,001

(22) Filed: Dec. 17, 2014

(65) Prior Publication Data

US 2015/0168665 A1    Jun. 18, 2015

Related U.S. Application Data

(60) Provisional application No. 61/916,942, filed on Dec. 17, 2013.

(51) Int. Cl.
*G02B 7/02* (2006.01)
*G02B 27/62* (2006.01)
*F21V 17/02* (2006.01)

(52) U.S. Cl.
CPC ............... *G02B 7/02* (2013.01); *G02B 7/023* (2013.01); *G02B 27/62* (2013.01); *F21V 17/02* (2013.01); *Y10T 29/49876* (2015.01); *Y10T 29/53913* (2015.01)

(58) Field of Classification Search
CPC ........ G02B 7/02; G02B 7/023; G02B 27/62; G02B 6/32; G02B 6/4204; G02B 6/4206; G02B 6/4236; F21V 17/02; G03B 11/041; G03B 17/14; Y10T 29/49876; Y10T 29/53913; Y10T 29/53917
USPC ......... 359/819, 825–827, 830; 362/277, 319, 362/449; 29/270–272, 453
See application file for complete search history.

(56) References Cited

U.S. PATENT DOCUMENTS

| | | | | |
|---|---|---|---|---|
| 3,423,146 A | * | 1/1969 | Weaver | G02B 15/04 359/422 |
| 4,709,311 A | * | 11/1987 | Bornhorst | F21V 17/02 359/826 |
| 6,262,853 B1 | | 7/2001 | Takanashi et al. | |
| 6,932,521 B2 | | 8/2005 | Campbell et al. | |
| 7,802,931 B2 | * | 9/2010 | Kogure | G03B 11/041 359/828 |

* cited by examiner

*Primary Examiner* — Loha Ben
(74) *Attorney, Agent, or Firm* — Myers Bigel, P.A.

(57) ABSTRACT

A ball cage centered lens assembly is provided including an axially thick lens; an outer mechanical cell; an intermediate cage positioned between the axially thick lens and the outer mechanical cell; a plurality of deformable elements positioned within the cage, between the axially thick lens and the mechanical cell, and in contact with the axially thick lens and the outer mechanical cell.

11 Claims, 7 Drawing Sheets

BALL CAGE ASSEMBLIES FOR CENTRATION OF AXIALLY THICK LENSES AND RELATED METHODS AND SYSTEMS

CLAIM OF PRIORITY

The present application claims priority to U.S. Provisional Application Ser. No. 61/916,942, filed Dec. 17, 2013, the disclosure of which is hereby incorporated herein by reference as if set forth in its entirety.

FIELD

The present inventive concept relates generally to lenses and, more particularly to location of lenses within a lens assembly.

BACKGROUND

Precision assembly of lenses into lens systems requires precise and stable location of the optical elements, typically singlet or doublet lenses, with respect to mechanical datums in the cell or barrel of the lens system. While many techniques exist for the precise location of axially thin lenses, the location of an axially thick lens presents difficulties, especially the simultaneous achievement of accurate centration and tilt of the optical element. The problem is especially difficult for lenses where the clear apertures required on the optical surfaces are comparable in size to the edge diameter of the lens, as both external optical surfaces may not be available for mechanical registration. Often the lens element is fabricated with a low wedge error, i.e., the angle between the external optical surfaces, but additional tilt is introduced when the optical element is potted into a mechanical cell. This tilt error is introduced by the required diametral clearance between the outer diameter (OD) of the lens element versus the internal diameter (ID) of the mechanical cell. Some clearance is required to allow assembly, and this clearance allows slop between the two components resulting in an unwanted residual tilt of the optical component with respect to mechanical datums in the lens cell. To attempt to address this problem the lens may be actively tilted with feedback to determine proper alignment. The problem may be further addressed by careful metrology of the mating components and sorting to achieve the lowest clearance fit; or in high-volume applications, post-assembly sorting and rework of the assemblies. These approaches may be very expensive and, therefore, improved methods of addressing the problem discussed above may be desired.

SUMMARY

Some embodiments of the present inventive concept provide a ball cage centered lens assembly including an axially thick lens; an outer mechanical cell; an intermediate cage positioned between the axially thick lens and the outer mechanical cell; a plurality of deformable elements positioned within the cage, between the axially thick lens and the mechanical cell, and in contact with the axially thick lens and the outer mechanical cell.

In further embodiments, the deformable elements may include a plurality of small deformable balls. The deformable balls may be polymeric balls, for example, one of Nylon and Delrin.

In still further embodiments, the deformable elements in the ball cage centered lens assembly may be compressed during a press fitting of the intermediate cage into the lens cell.

Some embodiments of the present inventive concept provide a system for inserting a ball cage into a mechanical lens cell, the system including: a ball cage comprising a plurality of small deformable balls; a mechanical lens cell configured to receive the ball cage including the plurality of small deformable balls; and a tooling configured to insert the ball cage into the mechanical lens cell to provide a ball cage centered lens assembly.

In further embodiments, the tooling may include: a mandrel configured to receive the ball cage; a pusher tube configured to press the ball cage into the mechanical lens cell; a sleeve tube to retain the balls after the balls have been loaded into to the ball cage; and a lock pin configured to lock the components together once the ball cage has been loaded.

In still further embodiments, the ball cage assembly may include a plurality of small deformable balls. The small deformable balls may be polymeric balls, for example, one of Nylon and Delrin.

Some embodiments of the present inventive concept provide a method for assembling a ball cage centered lens assembly, the method including: preparing a lens cell; preparing ball cage insertion tooling; inserting the lens into the lens cell; press fitting the ball cage around the lens into the cell using the insertion tooling; and removing the ball cage insertion tooling.

In further embodiments, the method may further include installing axial preload; and installing radial adjusters.

In still further embodiments, installing the radial adjusters may be followed by: fine adjusting a lens tilt; potting the lens; removing the radial adjusters; performing a final clean; and inspecting the assembly.

DETAILED DESCRIPTION

Figure 1:
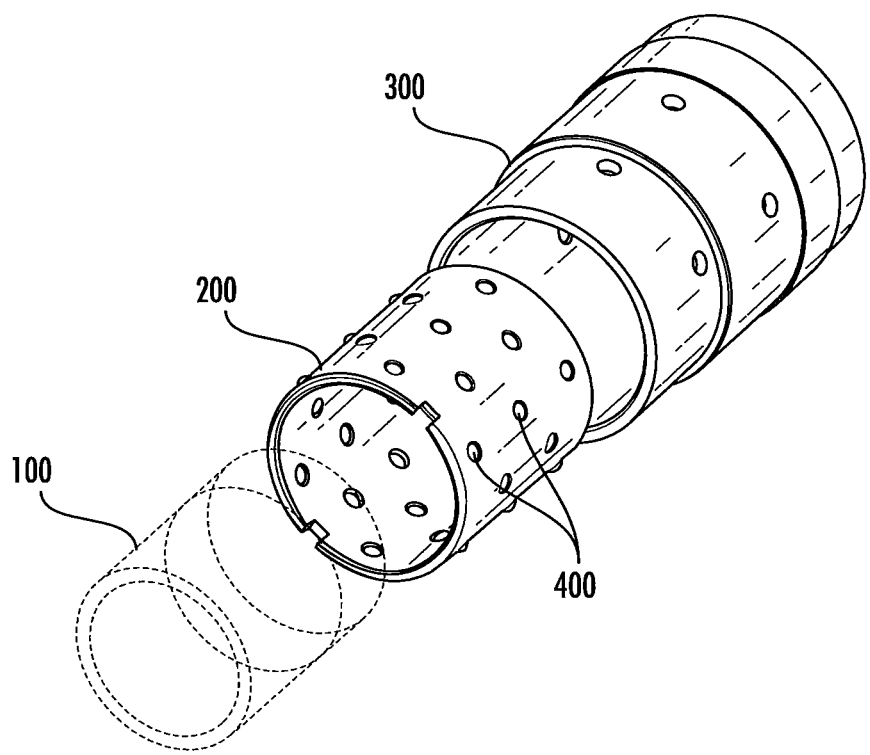
FIG. 1 is a diagram illustrating an exploded view of a ball cage lens centration assembly in accordance with some embodiments of the present inventive concept.

The present inventive concept will be described more fully hereinafter with reference to the accompanying figures, in which embodiments of the inventive concept are shown. This inventive concept may, however, be embodied in many alternate forms and should not be construed as limited to the embodiments set forth herein.

Accordingly, while the inventive concept is susceptible to various modifications and alternative forms, specific embodiments thereof are shown by way of example in the drawings and will herein be described in detail. It should be understood, however, that there is no intent to limit the inventive concept to the particular forms disclosed, but on the contrary, the inventive concept is to cover all modifications, equivalents, and alternatives falling within the spirit and scope of the inventive concept as defined by the claims. Like numbers refer to like elements throughout the description of the figures.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components, but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to another element, there are no intervening elements present. As used herein the term "and/or" includes any and all combinations of one or more of the associated listed items and may be abbreviated as "/".

Unless otherwise defined, all terms (including technical and scientific terms) used herein have the same meaning as commonly understood by one of ordinary skill in the art to which this inventive concept belongs. It will be further understood that terms used herein should be interpreted as having a meaning that is consistent with their meaning in the context of this specification and the relevant art and will not be interpreted in an idealized or overly formal sense unless expressly so defined herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure. Although some of the diagrams include arrows on communication paths to show a primary direction of communication, it is to be understood that communication may occur in the opposite direction to the depicted arrows.

As discussed above, while many techniques exist for the precise location of axially thin lenses, the location of an axially thick lens presents difficulties, especially the simultaneous achievement of accurate centration and tilt of the optical element. As used herein, axially thick lenses are lenses whose optical properties are not well described by thin-lens equations, and whose structure may be defined by small edge diameter-to-center thickness ratios, for example, ratios less than about 4. Conventional methods of addressing this problem may not be cost effective and may not fully address the problem.

Accordingly, some embodiments of the present inventive concept allow low tilt opto-mechanical assemblies to be achieved via controlled plastic deformation of plastic balls used in a cage assembly interposed between the optical element and the mechanical cell. As will be discussed herein, methods according to the inventive concept involve the insertion of one or more balls between the outer diameter (OD) of the optical element and the inner diameter (ID) of the mechanical cell, such that there is in all cases a slight interference in the fit. In these embodiments, an accurate centration and tilt performance of an interference fit, used routinely in metal-in-metal applications, can be applied to this more delicate precision assembly involving inherently incompressible glass as will be discussed further with respect to FIGS. 1 through 7.

Referring first to FIG. 1, an exploded view of a ball cage lens centration assembly in accordance with some embodiments of the present inventive concept will be discussed. As illustrated in FIG. 1, one or more (or a plurality) of deformable elements 400 are loosely housed in a "ball cage" 200. In some embodiments, the deformable elements may include a plurality of small deformable balls. Although embodiments of the present inventive concept refer to the deformable elements 400 as "balls", embodiments of the present inventive concept are not limited to this configuration.

In some embodiments, the ball cage 200 may be similar to those used in standard linear shaft ball bearing slide assemblies. The balls in the ball cage 200 may be made of various materials, for example, common engineered plastics, such as Nylon or Delrin, which have very good mechanical properties and are relatively inexpensive. The balls may be obtained with arbitrarily tight diameter tolerances either through direct purchase or via diameter sorting. The ball cage is a low-tolerance low-cost part that is used to keep the balls properly located and distributed. In some embodiments, a temporary outer sleeve (not shown) can be used in the assembly process to keep the balls in their respective holes prior to press-fitting.

Figure 2:
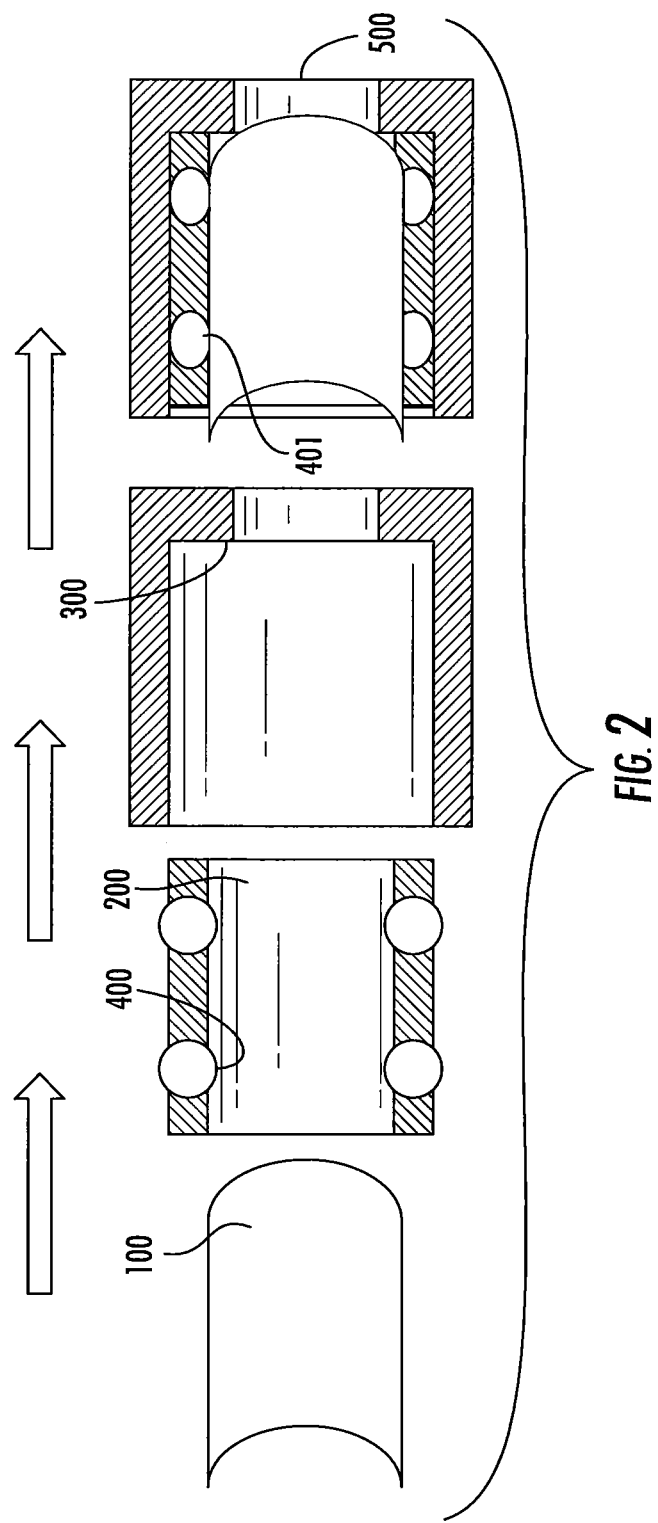
FIG. 2 is a block diagram illustrating a lens assembly in accordance with some embodiments of the present inventive concept.

Referring now to FIG. 2, a block diagram illustrating a lens assembly in accordance with some embodiments of the present inventive concept will be discussed. The ball cage centered lens assembly 500 includes: an axially thick lens 100; the ball cage assembly 200 with uncompressed balls 400; and the mechanical lens cell 300. The compression of the balls as a result of the press fit is shown schematically 401.

In particular, as illustrated in FIG. 2, the ball cage assembly 200 with compressible balls 400 is inserted over the OD of the optical element 100 and the entire assembly is pressed into the ID of the mechanical cell 300 to create the completed assembly 500. By proper sizing of the ball diameters, lens element OD, and cell ID, the amount of interference, and resulting ball deformation 401, can be controlled. The equation that relates force required to produce a given deformation between two spheres in contact can be used to accurately calculate deflections and resulting preload forces:

$$F = \frac{4}{3} \cdot E_{\mathit{eff}} \cdot \sqrt{\frac{d}{2}} \cdot \delta^{3/2} \qquad \text{(Eqn. 1)}$$

where d is the ball diameter, δ is the deflection due to deformation, and $E_{\mathit{eff}}$ is the effective elastic modulus given by Eqn. 2 set out below:

$$\frac{1}{E_{\mathit{eff}}} = \frac{1 - v_1^2}{E_1} - \frac{1 - v_2^2}{E_2} \qquad \text{(Eqn. 2)}$$

where E and v are the elastic modulus and Poisson's Ratio for the constituent material of the components identified by the subscripts 1 and 2. Applying these equations to the ball-optical element, and ball-cell interfaces allows the preload forces to be calculated for a given amount of interference. Thus, the precision of the fit of the assembly can be engineered to requirement.

Figure 3:
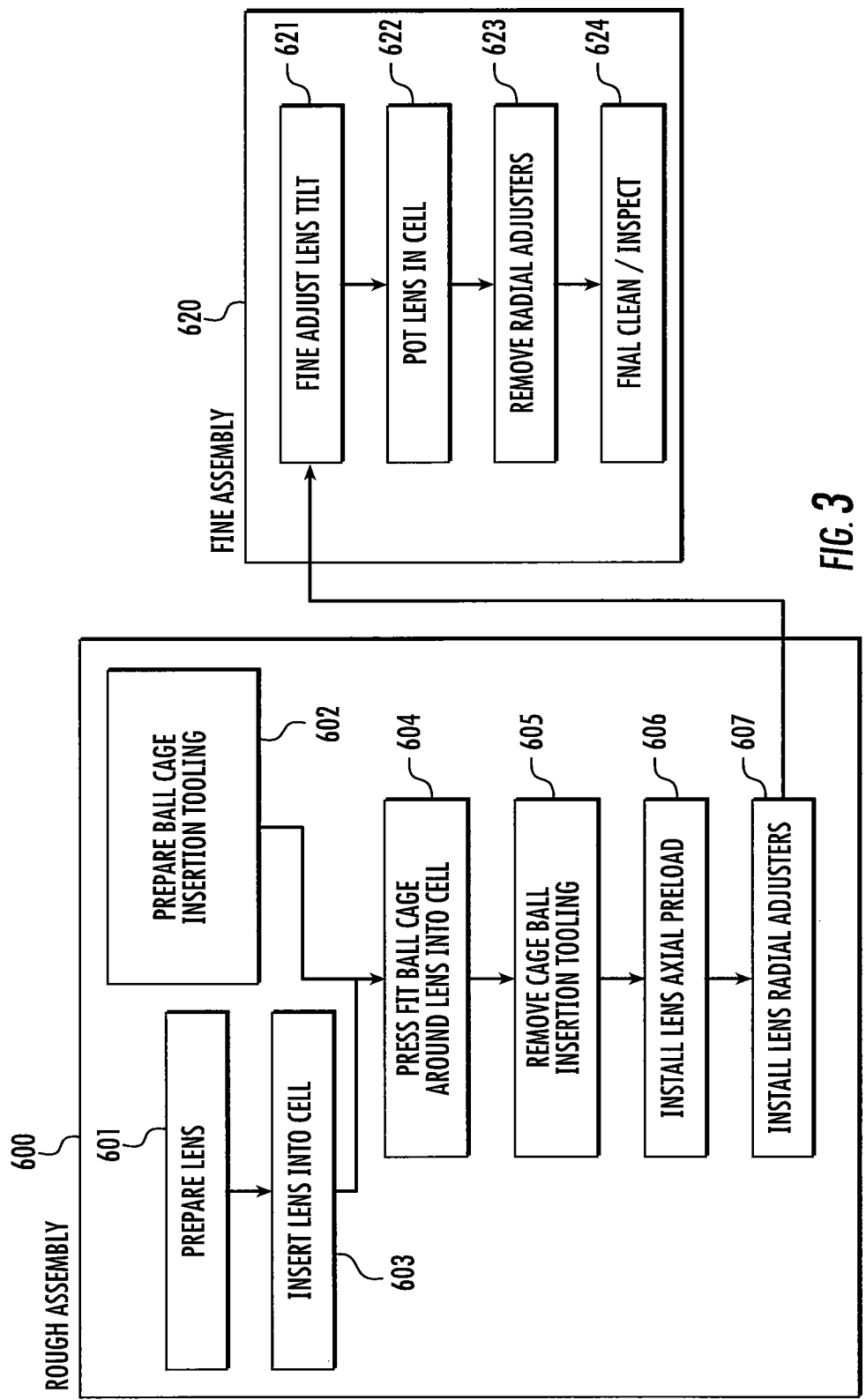
FIG. 3 is a flowchart illustrating operations of the lens assembly procedure in accordance with some embodiments of the present inventive concept.

Referring now to FIG. 3, a flowchart illustrating steps in both rough and fine assembly of the ball cage in accordance with some embodiments of the present inventive concept will be discussed. The assembly steps can be roughly divided into two types: rough assembly 600, which typically does not require any fine adjustment or metrology; and fine assembly 620, which may require fine adjustment of lens tilt and feedback metrology. Referring first to block 601 in the rough assembly 600, operations begin by preparing the lens (block 601). The ball cage insertion tooling is prepared (block 602) and the lens is inserted into the cell (block 603). Press fit the ball cage around the lens into the cell (block 604) using the insertion tooling and remove the ball cage insertion tooling (block 605). The lens axial preload is installed (block 606) and the lens radial adjusters are installed (block 607). Thus, in the rough assembly 600, all the components are installed in the mechanical lens cell to create the full, non-aligned assembly.

In contrast, in the fine assembly portion of the procedure 620, the lens tilt is adjusted to meet specified requirements, the lens is potted, or fixed, in the cell, and the lens assembly is finalized. In particular, operations begin after block 607 of the rough assembly by fine adjusting the lens tilt (block 621). The lens is potted (block 622) and radial adjusters are removed (block 623). A final clean is performed and the assembly is inspected (block 624).

Figure 4:
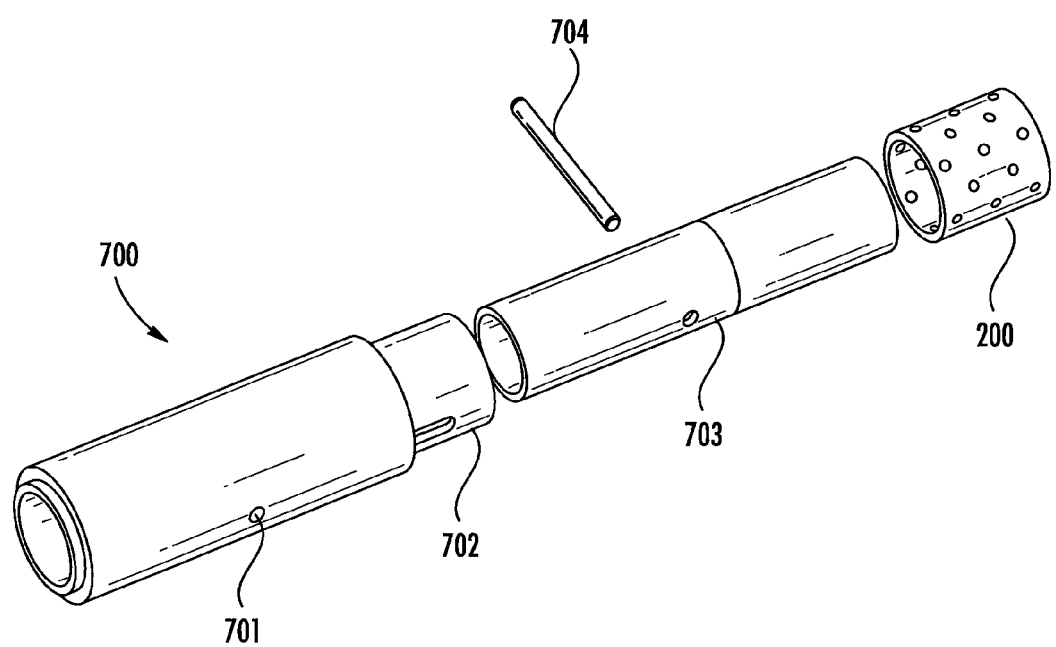
FIG. 4 is a diagram illustrating ball cage insertion tooling in accordance with some embodiments of the present inventive concept.
Figure 5:
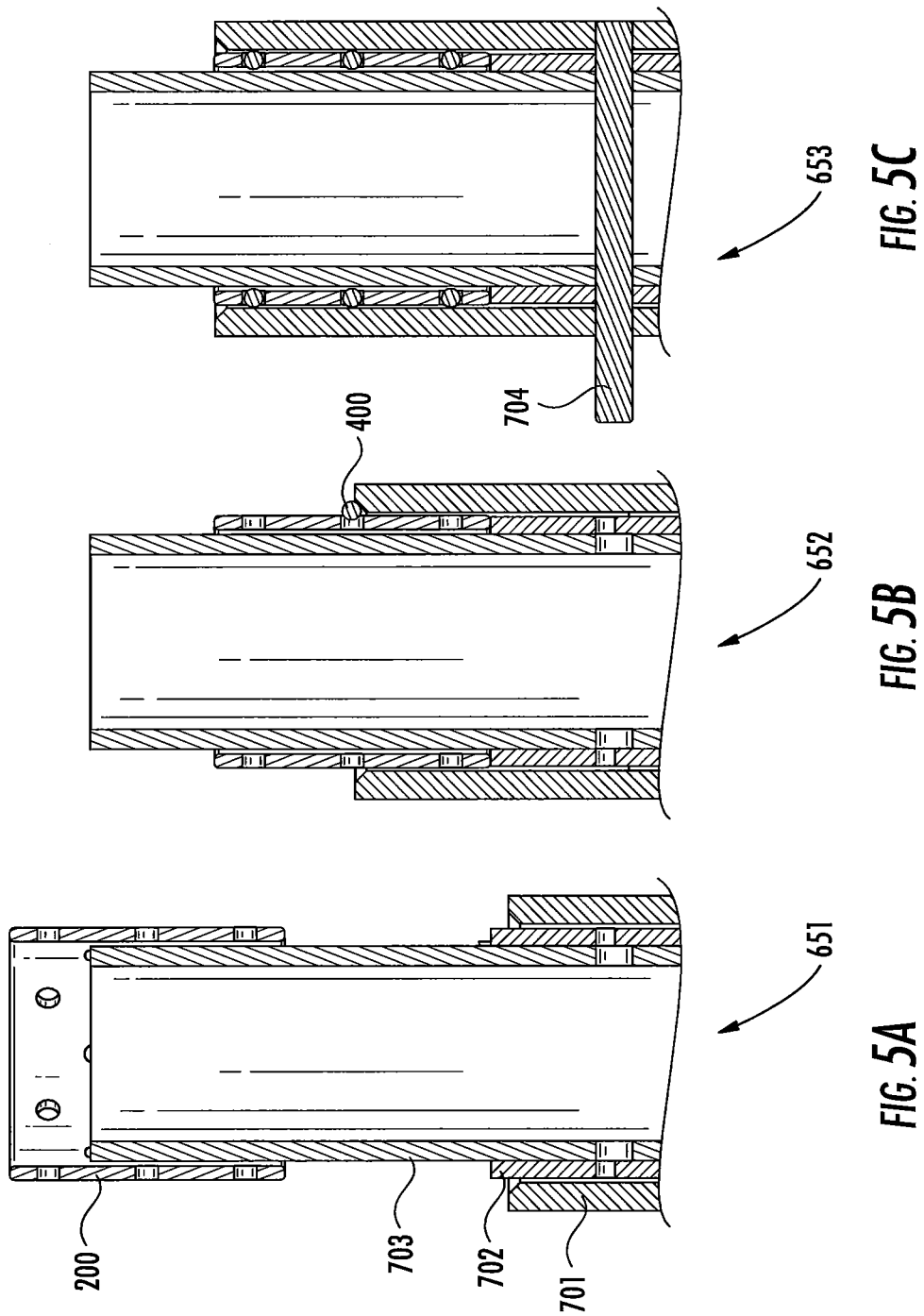
FIGS. 5A through 5C are diagrams illustrating preparation of a ball cage for insertion in accordance with some embodiments of the present inventive concept.
Figure 6:
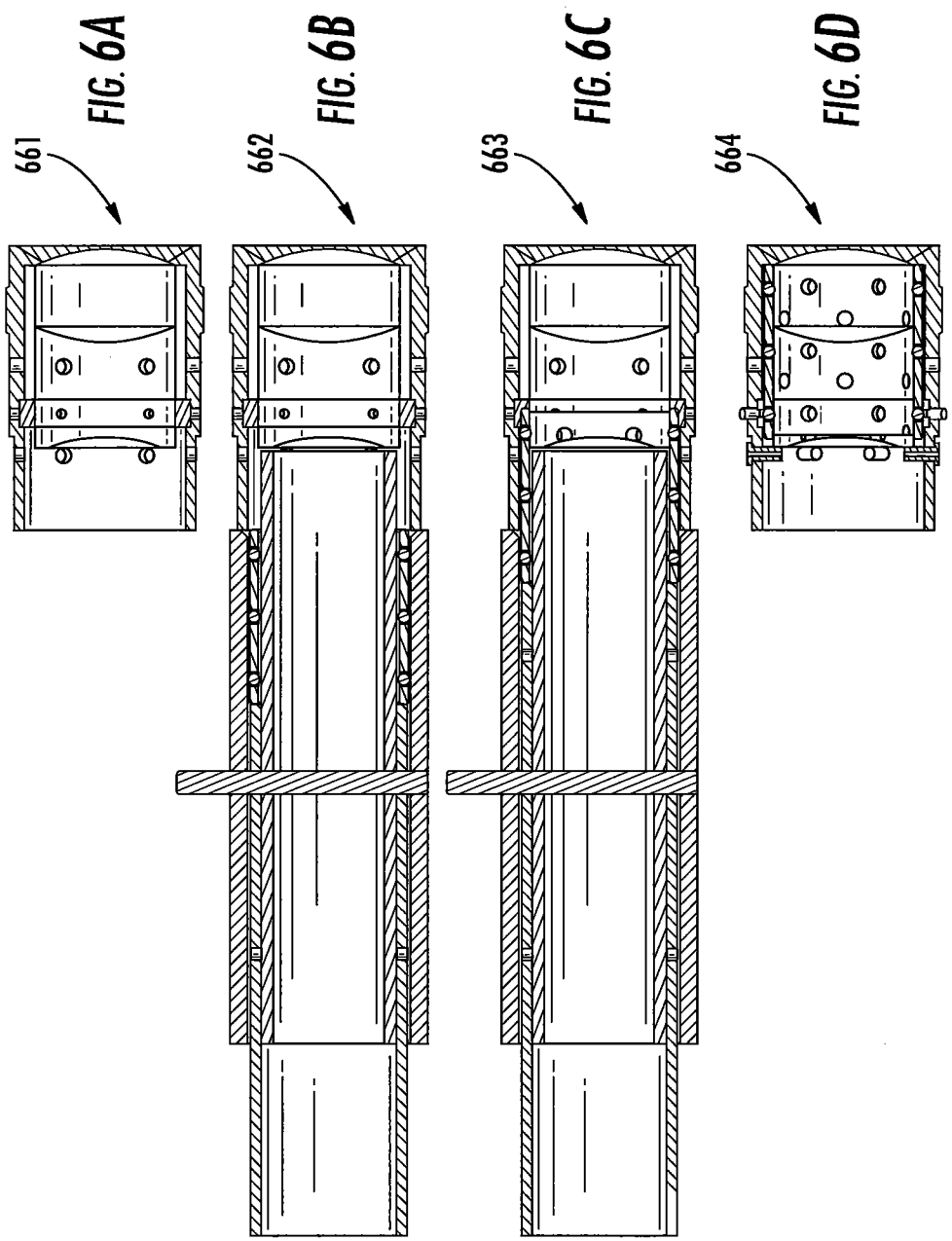
FIGS. 6A through 6D are diagrams illustrating ball cage insertion in accordance with some embodiments of the present inventive concept.

Referring now to FIG. 4, a diagram illustrating an example of tooling 700 in accordance with some embodiments of the present inventive concept will be discussed. Tooling can be used for ball cage insertion as discussed above with respect to FIG. 3. The tooling consists of the following simple components: a mandrel 703, on which the ball cage 200 is placed; a pusher tube 702, which is used to press the loaded ball cage into the lens cell; a sleeve tube 701, which retains the balls after loading into holes in the ball cage; and a lock pin 704, which locks the components together once the ball cage has been loaded. This tooling 700 allows convenient loading and retention of the balls into the holes of the ball cage. It also allows the loaded ball cage to be securely handled and to be inserted into the lens assembly without loss of any of the balls.

Referring now to FIGS. 5A through 5C, various cross-sections of the insertion tooling illustrating how the balls can be loaded into the ball cage using the insertion tooling will be discussed. FIG. 5A illustrates an empty ball cage being inserted (651) onto the mandrel 703. FIG. 5B illustrates how balls 400 can be dropped into the holes of the ball cage (loaded into the ball cage 652) and then retained by sliding up the sleeve 701. Finally, FIG. 5C illustrates the completely loaded ball cage with tooling (653) locked by means of a lock pin 704. At this point the ball cage has been prepared for the next assembly process, press fit insertion of the ball cage into the lens cell as discussed above.

Referring now to FIGS. 6A through 6D, various cross-sections illustrating steps of press fitting the loaded ball cage 200 into the lens assembly 664. As illustrated in FIG. 6A, the axially thick lens is inserted into the mechanical lens cell (661). Note that the lens is not radially located, but a gap exists between its barrel and the inner diameter of the cell. As illustrated in FIG. 6B, the insertion tooling is installed in preparation for the press fit insertion of the loaded ball cage into the gap between lens and cell (662). As illustrated in FIG. 6C, the pusher tube is actuated to force the loaded ball cage assembly into the gap (663). Finally, after full insertion of the ball cage assembly, the ball centered lens assembly is completed by installation of the axial preload plugs and radial adjustment screws (664). Once the fine adjustments are completed, the lens cell can be potted, or fixed in place, by injection of appropriate potting compounds through the injection holes.

Figure 7:
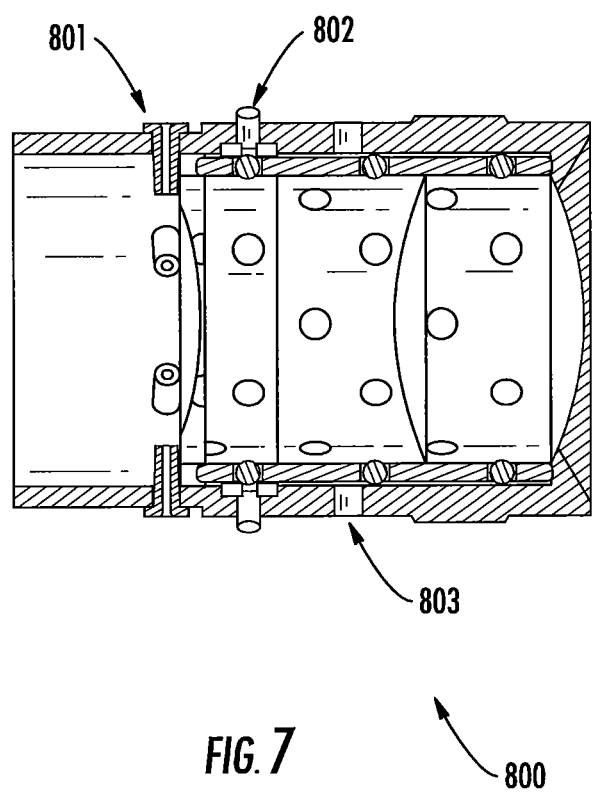
FIG. 7 is a diagram illustrating a cross-section of a completed ball cage assembly in accordance with some embodiments of the present inventive concept.

Referring now to FIG. 7, a diagram illustrating a cross-section of a completed ball cage lens assembly in accordance with some embodiments of the present inventive concept will be discussed. As illustrated in FIG. 7, a cross-section of the completed ball centered lens assembly 800 contains the following components: the fully press inserted ball cage assembly; the axial preload plugs 801 used to preload the axially thick lens against the contact ring in the mechanical cell; the radial adjuster 802 screws used for precision lens tilt adjustment; the mechanical lens cell; and the holes 803 in this cell used for injecting an appropriate potting compound for final fixing the lens adjustment.

In the drawings and specification, there have been disclosed exemplary embodiments of the inventive concept. However, many variations and modifications can be made to these embodiments without substantially departing from the principles of the present inventive concept. Accordingly, although specific terms are used, they are used in a generic and descriptive sense only and not for purposes of limitation, the scope of the inventive concept being defined by the following claims.

That which is claimed is:

1. A ball cage centered lens assembly comprising:
an axially thick lens;
an outer mechanical cell;
an intermediate cage positioned between the axially thick lens and the outer mechanical cell;
a plurality of deformable elements positioned within the cage, between the axially thick lens and the mechanical cell, and in contact with the axially thick lens and the outer mechanical cell.

2. The assembly of claim 1, wherein the deformable elements include a plurality of small deformable balls.

3. The assembly of claim 2, wherein the deformable balls are polymeric balls.

4. The assembly of claim 3, wherein the polymeric balls comprise one of Nylon and Delrin.

5. The assembly of claim 1, wherein the deformable elements in the ball cage centered lens assembly are compressed during a press fitting of the intermediate cage into the outer mechanical cell.

6. A system for inserting a ball cage into a mechanical lens cell, the system comprising:
a ball cage comprising a plurality of small deformable balls;
a mechanical lens cell configured to receive the ball cage including the plurality of small deformable balls; and
a tooling configured to insert the ball cage into the mechanical lens cell to provide a ball cage centered lens assembly.

7. The system of claim 6, wherein the tooling comprises:
a mandrel configured to receive the ball cage;
a pusher tube configured to press the ball cage into the mechanical lens cell;
a sleeve tube to retain the balls after the balls have been loaded into to the ball cage; and
a lock pin configured to lock the assembled components together once the ball cage has been loaded.

8. The system of claim 6, wherein the small deformable balls are polymeric balls and comprise one of Nylon and Delrin.

9. A method for assembling a ball cage centered lens assembly, the method comprising:
   preparing a lens cell, the lens cell comprising a plurality of small deformable balls;
   preparing ball cage insertion tooling;
   inserting a lens into the lens cell;
   press fitting a ball cage around the lens into the cell using the insertion tooling; and
   removing the ball cage insertion tooling.

10. The method of claim 9, further comprising:
    installing axial preload; and
    installing radial adjusters.

11. The method of claim 10, wherein installing the radial adjusters is followed by:
    fine adjusting a lens tilt;
    potting the lens;
    removing the radial adjusters;
    performing a final clean; and
    inspecting the assembly.

* * * * *